(12) United States Patent
Galivanche et al.

(10) Patent No.: US 11,942,731 B1
(45) Date of Patent: Mar. 26, 2024

(54) APPARATUS AND METHODS FOR VERIFICATION OF INTERCHANGEABLE CONNECTORS

(71) Applicant: Zoox, Inc., Foster City, CA (US)

(72) Inventors: Rajeshwar Galivanche, Saratoga, CA (US); Vikram Laxmish Shirgur, Morgan Hill, CA (US); Hudson Widman, Hayward, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/991,860

(22) Filed: Nov. 22, 2022

(51) Int. Cl.
| | | |
|---|---|---|
| *H01R 13/66* | (2006.01) | |
| *G06K 7/10* | (2006.01) | |
| *G06K 19/07* | (2006.01) | |
| *H01R 13/46* | (2006.01) | |

(52) U.S. Cl.
CPC ....... *H01R 13/665* (2013.01); *G06K 7/10297* (2013.01); *G06K 19/0723* (2013.01); *H01R 13/465* (2013.01); *H01R 2201/26* (2013.01)

(58) Field of Classification Search
CPC ................ H01R 13/665; H01R 13/465; G06K 7/10297; G06K 19/0723

USPC .......................................................... 235/492
See application file for complete search history.

(56) References Cited

U.S. PATENT DOCUMENTS

| | | | | |
|---|---|---|---|---|
| 7,167,078 | B2* | 1/2007 | Pourchot | H01R 13/7038 340/5.1 |
| 10,931,142 | B2* | 2/2021 | Moon | G08C 17/02 |
| 11,548,401 | B1* | 1/2023 | Malli Raghavan | B60L 53/305 |
| 11,699,885 | B1* | 7/2023 | Pavlovic | H01R 13/6581 235/451 |
| 2006/0190538 | A1* | 8/2006 | Hwang | H04L 67/51 709/204 |
| 2019/0372262 | A1* | 12/2019 | Christiano | H01R 13/436 |
| 2020/0412058 | A1* | 12/2020 | Poemmerl | H01R 13/641 |

* cited by examiner

*Primary Examiner* — Ahshik Kim
(74) *Attorney, Agent, or Firm* — EIP US LLP

(57) ABSTRACT

Techniques for verification of interchangeable connectors are disclosed which include applying one or more identification tags to connectors. The identification tags have identifiers which may be associated with one another for connectors that correspond. The identifiers may be read from the identification tags when the connectors are connected to determine if the connected connectors are associated.

20 Claims, 5 Drawing Sheets

APPARATUS AND METHODS FOR VERIFICATION OF INTERCHANGEABLE CONNECTORS

BACKGROUND

Vehicle electrical harnesses typically include multiple individually insulated conductors or cables that are used to electrically interconnect various components of the vehicle to transmit electrical signals and/or power between the components. Each of the conductors or groups of conductors in the harness is designed to be connected to a component at a particular location in the vehicle, and each of the conductors may each have a specific electrical connection that is accomplished through the harness.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
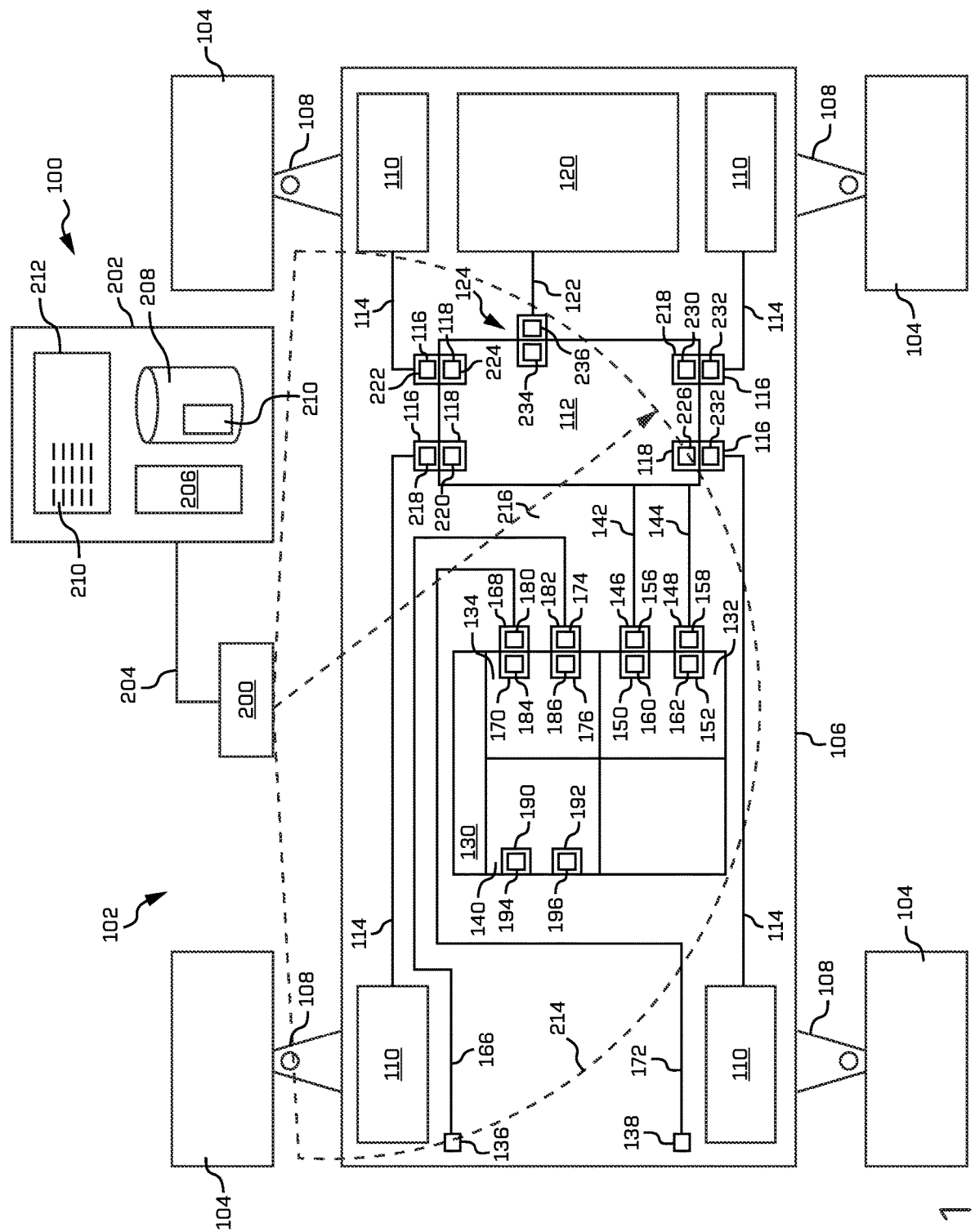
FIG. 1 is a diagrammatic view of a verification system that may be used to verify that electrical connectors are correctly connected in a vehicle, according to one or more examples.

Techniques described herein are directed to methods and apparatus for verification of interchangeable connectors. A connector may refer to one part of a connection assembly, such as a plug or a receptacle, while a connection assembly may refer to both a plug and an associated receptacle. When a connection assembly is connected, or connecting the connectors, may refer to the plug and receptacle being physically engaged and electrically connected to one another. The correct electrical connection between a plug connector and receptacle connector may be referred to as a correct connection. A plug connector and receptacle connector that make a correct electrical connection may be referred to as corresponding connectors.

The components may be connected to conductors in a vehicle harness using connector assemblies that may include a plug and a receptacle. In order for the vehicle to operate properly, each of the components should be connected to the correct conductors in the vehicle harness. In some instances, a vehicle may have hundreds of connector assemblies and some of these connector assemblies may be located in close proximity to one another in the vehicle.

In order to avoid connecting a component to the wrong connector in the harness, some harnesses and components may include connectors that are "keyed" such that they are only physically connectable to a corresponding keyed connector that has the same key and can only be connected in one orientation. Alternatively, different connectors may have different pin configurations, sizes, shapes, etc. Such systems may prevent a component from being connected to the wrong conductors in the vehicle harness. However, these system require large numbers of different connectors having different configurations which may be cost ineffective in large, complex systems such as electric vehicles.

In some circumstances it may be beneficial to have a vehicle harness that uses connectors that are physically common. Physically common connectors may be interchangeable, in other words, one or more common plug may be physically connected to one or more common receptacle. Common connectors may be connectors that have the same configuration as one another. For example, a common connector plug may be connected to any one of a number of common connector receptacles; and a common connector receptacle may be connected to any one of a number of common connector plugs. An example of a common plug and receptacle may be an RJ45 Ethernet plug and an RJ45 Ethernet jack (receptacle) because any of these plugs may be physically connected to any of these jacks. The types of common connectors may be referred to as interchangeable.

In some applications, there may be hundreds or thousands of connections in a wiring harness. For some wiring harnesses, it may be advantageous to use common connectors wherever practical so that the inventory of different parts that need to be stocked may be reduced. Using common connectors may also provide cost efficiencies in buying connectors at scale. Conventional systems may have used different configurations of connectors to avoid incorrect connection, however in systems with large numbers of connectors may be inefficient to have different configurations for each combination of connectors.

Common connectors may be connectors that have the same configuration. For example, a common connector plug may be connected to any one of a number of common connector receptacles; and a common connector receptacle may be connected to any one of a number of common connector plugs. Using common connectors may reduce costs and complexity since multiple different special connectors may not have to be designed and ordered. In addition, using common connectors may eliminate the need for coordination between the manufacturer of components and the manufacturer of the wiring harness on the type and configuration of the connector to be used. A vehicle may include one or more harnesses and some of the harnesses may be sub-harnesses that may connect to another harness.

In some instances, when common connectors are used, there may be a need to identify which connectors need to be connected together for proper functionality of the vehicle electrical systems when the vehicle is assembled. Connecting the wrong connectors may result in one or more vehicle electrical systems not working properly, or in some instances may result in damage to one or more vehicle electrical components. In addition, during conventional manufacture of the vehicle, finding a misconnected connection assembly may require the application of testing equipment and may be time consuming. These electrical components may include processing units, sensors, motors, communication devices, and/or other vehicle components that use electricity.

In some implementations, verifying interchangeable connectors may involve a verification system that includes applying an identification tag to one or more connector in a vehicle electrical system and associating identifiers of the identification tags for connectors that make correct electrical connections with one another. In some examples, the identification tag of a connector may be enabled when the connector is connected. In some examples, the identification tag may be a radio-frequency identification (RFID) tag, visually identifiable tag (e.g., a bar code tag), or other. In some examples, the identification tag may be mechanically coupled to the one or more connector. In some examples the mechanical coupling may involve the use of an adhesive or other technique to apply or affix the identification tag permanently or temporarily to the one or more connector.

In some implementations, an identification tag may be applied to a plug connector and another identification tag may be applied to a receptacle connector. In some examples, one or both of the identification tags may be applied to the connectors during manufacture of the vehicle. In some examples, one or both of the identification tags may be applied to the connectors during manufacture of a wiring harness for the vehicle and/or during manufacture of an electrical component of the vehicle. In some examples, the identification tags may be applied as an operational matter, such as during an incoming quality check. In some examples, the identification tags may be applied, and the connection checked during prototyping of the vehicle.

Each of the identification tags may have an identifier which may include one or more words, letters, numbers, and/or symbols. The identification tag identifier for the plug connector may be the same or may be different than the identification tag identifier for the corresponding receptacle connector. The verification system may include associating the identification tag identifier of the plug connector with the identification tag identifier of the corresponding receptacle connector. The verification system may include one or more database to store the associated identifiers. In some examples, the associated identifiers may be stored along with a description of the use of the connection assembly of the connectors. In some examples, the description of the use may include a name of an electrical component and/or wiring harness.

During the manufacture of the vehicle, the wiring harness(s) may be installed separately from various electrical components. In some implementations, the verification system may include an identification tag reader for reading the identification tags. In some examples, the identification tag identifiers of the connectors may be read before and/or after the connectors are connected to verify that the connectors correspond so that the connection is a correct connection. In some examples, after the identifiers are read, the verification system may access the database to determine if the identifiers are associated with one another. Determination that the identifiers are associated with one another may indicate that the connectors correspond and that the correct electrical connection is verified as correct. The verification system may indicate to a user that the connection is verified. In some examples, when the verification system accesses the database, and the system determines that the identifiers are not associated with one another then the verification system may indicate that the connection is incorrect. The system may indicate the verification or lack of verification of the connection using a visual, audio, haptic and/or other indication to notify the user. If the connection is not verified, then the user may disconnect the connectors and may try another combination of connectors having identification tags. In some examples, verifying that the connections are correct may be used in debugging problems with the wiring harness without the need for powering the harness or the use of expensive testing equipment. In some examples, it is advantageous to be able to verify that connections are correct without power the wiring harness because the wiring harness is not yet connected to a power source and/or a power source may not be conveniently available.

In some examples, the identification tag may be an RFID tag that may be applied to the connector. The RFID tag may be applied to the connector using an adhesive or other method. In some examples, the part or all of the RFID tag may be between a portion of each of the connectors when they are connected. In some examples, the RFID tag may be at least partially inside a recessed portion of a receptacle connector. In some examples, the RFID tag may be at least partially on an outside surface of a plug connector. When the connectors are connected, the RFID tag may be partially or fully hidden, or may be exposed.

In some implementations, the identification tag identifiers may be enabled when the connectors are physically connected. In examples in which the identification tag is an RFID tag, the tag may include a chip and an antenna, and the tag may be enabled by electrically connecting the antenna to the chip when the connectors are connected. In some examples, the RFID tag may be a passive type tag that receives power from a source, such as the reader, and in response transmits the identifier. In some examples, the antenna may be connected to one of the connectors and the chip connected the other of the connectors, and when the connectors are connected, the chip and antenna are electrically connected so that the RFID tag is enabled.

In some implementations, the identification tag may be connected to a harness side of a connection assembly and an antenna may be on a bulkhead side of the connection assembly. Enabling the RFID tag may include causing the tag to be able to receive RF power and/or to transmit the identifier. In some examples in which the identification tag is an RFID tag, the tag may include a pressure activated switch which may be pressed when the connectors are connected to enable the RFID tag. In some examples, the pressure activated switch may be a mechanical, pressure-sensitive coupling. In some examples, the pressure activated switch may electrically connect the antenna and the chip to enable the RFID tag. In some examples, the identification tag may be enabled using a change or property related to capacitance, inductance, resistance, conductance, or other property which may enable the operation of an electrical circuit. In some examples, the identification tag may be enabled using a magnetic field.

In some implementations, enabling the identification tag when the connectors are physically connected allows the verification system to distinguish the identifiers from other identifiers that may already be enabled. By knowing which identifiers are already enabled, the verification system may identify which identifiers are newly enabled by the connection of two connectors. The identifiers that are enabled by the connection may be read and checked against the database to see if the identifiers are associated to verify that the connectors correspond. In some examples, associated connectors may both have the same identifier, and then when reading the identification tags there may be two identification tags giving the same identifier every time that a physical connection is made.

RFID tags having different frequency ranges may be used. In some examples, the frequency range may be selected to minimize the number of RFID tags that may be read at a given time while still allowing the reader enough range to read the RFID tags on the connection to be verified. In some examples, the range on the identification tag reader may be such that the RFID tags may be read without being within line-of-sight of the reader. In some implementations, the identifiers of the RFID tags may be programmable, and the identifier may be programmed into the RFID tag before or after the RFID tag is applied to the connector. In some examples, the identifiers of the RFID tags may not be programmable, may be unique and may be entered into a database based on the connector to which the tag is connected.

In some examples, the identification tag may be a bar code. In some examples the bar code may be a one dimensional code, and in some examples, the bar code may be a two dimensional bar code, such as a QR code. In implementations in which the identification tag is a bar code, the identification tag reader may be a bar code reader and may include a laser that may scan the bar code(s) at a distance. In some examples, the bar code may be applied to the connectors such that the identification tag reader is able to read the identification tags on both connectors after they are connected to one another.

In some implementations, a unique identifier may be associated with corresponding connectors, and may be used for the same corresponding connectors for more than one vehicle. For example, the same identifier may be used for a connection between a wiring harness and a particular vehicle component for more than one vehicle. In some examples, the identifier used for a specific combination of corresponding connectors may not be used or re-purposed for other corresponding connectors. This may allow the verification of the connection after manufacturing, such as during maintenance, and/or during replacement of a connected component. In some implementations, the identifiers may be part of the schematics of the vehicle, which may allow technicians to verify the connections during or after manufacture of the vehicle. In some examples, the identifiers may be based in part on a version of the vehicle.

In some implementations, the identifiers of the identification tags may be entered into a database for a particular version of a vehicle. The identification tags may be applied to the correct connectors of the wiring harness and/or vehicle components. The wiring harness and/or vehicle components may be installed in the particular version of the vehicle and the plugs and receptacles of the wiring harness and/or vehicle components may be connected. The vehicle systems may be tested, which may include verifying the connections. The results of the testing may be stored in a database. In some examples, the testing may involve the use of a computer that may be connected to an identification tag reader. The database may be used to map identifiers to connectors. In some examples, the verification system may include reading the identifier from the identification tag, accessing the database to find the identifier that was read, and finding a description of what corresponds to the identifier that was read from the database.

FIG. 1 is a diagrammatic view of a verification system 100 that may be used to verify that electrical connectors are correctly connected in a vehicle 102. The vehicle 102, as shown in this example, includes four wheels 104 connected to a body 106 with suspension 108. Vehicle 102 is shown as an electric vehicle and may include drive motors 110 for driving the wheels 104. Each of the drive motors 110 may be connected to a motor controller 112 using an electrical cable 114 and connector 116. The motor controller 112 may include a corresponding connector 118 that corresponds to each connector 116. The vehicle 102 may also include a battery assembly 120 for providing electrical energy to the drive motors 110 through the motor controller 112 and for other vehicle systems. The battery assembly 120 may be connected to the motor controller 112 using one or more cable assembly 122 and a connector assembly 124.

The vehicle 102 may include a vehicle computing device 130 which can include one or more system controller, such as propulsion controller 132 for controlling propulsion of the vehicle 102 through the motor controller 112; and a perception controller 134 which may be used to control perception systems of the vehicle 102, such as sensors 136 and 138. The vehicle computing device 130 may include other system controllers, such as a safety system controller 140, for example.

The motor controller 112 includes cables 142, 144 and plug connectors 146, 148, and vehicle computing device 130 includes receptacle connectors 150, 152 for electrically connecting the motor controller 112 to the propulsion controller 132 of the vehicle computing device 130. Identification tags 156 and 158 are attached to plug connectors 146 and 148, respectively, and identification tags 160 and 162 are attached to receptacle connectors 150 and 152, respectively.

Sensor 136 includes a cable 166 and a plug connector 168, and vehicle computing device 130 includes a receptacle connector 170 for connecting sensor 136 to the perception controller 134. Sensor 138 includes a cable 172 and a plug connector 174, and vehicle computing device 130 includes a receptacle connector 176 for connecting sensor 138 to the perception controller 134. Identification tags 180 and 182 are attached to plug connectors 168 and 174, respectively, and identification tags 184 and 186 are attached to receptacle connectors 170 and 176, respectively.

The vehicle computing device 130 includes receptacle connectors 190 and 192 for connection to safety system controller 140. Receptacle connectors 190 and 192 include identification tags 194 and 196, respectively. The safety system controller 140 is not shown connected to any safety system devices in FIG. 1. The cables 142, 144, 166, 172, 114, and 122 may be grouped in one or more wiring harness or sub-harness, which may include other cables. Each cable 142, 144, 166, 172, 114 and 122 may have a single or multiple conductors.

In the example shown in FIG. 1, plug connectors 146, 148, 168 and 174 are common connectors that have the same configuration as one another. Also, in the example shown in FIG. 1, receptacle connectors 150, 152, 170, 176, 190 and 192 are common connectors that have the same configuration as one another. In addition, the connectors 116 for the drive motors 110 are common connectors that have the same configuration as one another, and the connectors 118 are common connectors that have the same configuration as one another.

The verification system 100 shown in FIG. 1 includes an identification tag reader 200 and a computing device 202 that may be connected to the tag reader 200 wirelessly or using a cable 204, as shown. The computing device 202 may include one or more processor 206 and one or more memory device 208, which may be or may include non-volatile computer readable memory. The memory device 208 includes a database 210 which may be displayed on a display 212 of the verification system 100.

In examples in which the identification tags are RFID tags, the verification system 100 may transmit a radio frequency electromagnetic radiation, (such as by the tag reader 200), represented by dashed line 214 that may be used to energize identification tags that are within a distance, represented by dashed line 216. In response to the energization, each RFID tag may then transmit an identifier which is received by the tag reader 200. The identification tags shown in FIG. 1 are for purposes of illustration, so all of the identification tags are shown a visible when the connections between the plugs and receptacles are made. However, the identification tags do not have to be visible either before or after connection when the identification tags are RFID tags.

In some examples, such as illustrated by connectors 116 and 118, the electrical system may include multiples of the same type of component, (e.g., drive motors 110), but each of the components may have to be connected to a particular connector for proper operation of the system. For example, identification tag 218 may be associated with identification tag 220, tag 222 may be associated with tag 224, tag 226 may be associated with tag 228, tag 230 may be associated with tag 232, and tag 234 may be associated with tag 236. In this example, the tags may be bar codes and the verification system 100 may include a bar code reader. The connection assembly 124 may include one or more ring connector and stud and/or other high current capacity connectors. The connectors 116 may be ring terminals or other connectors capable of high current capacity, the connectors 118 may be electrical studs, and the cables 114 may carry a high current to the drive motors 110.

Figure 2:
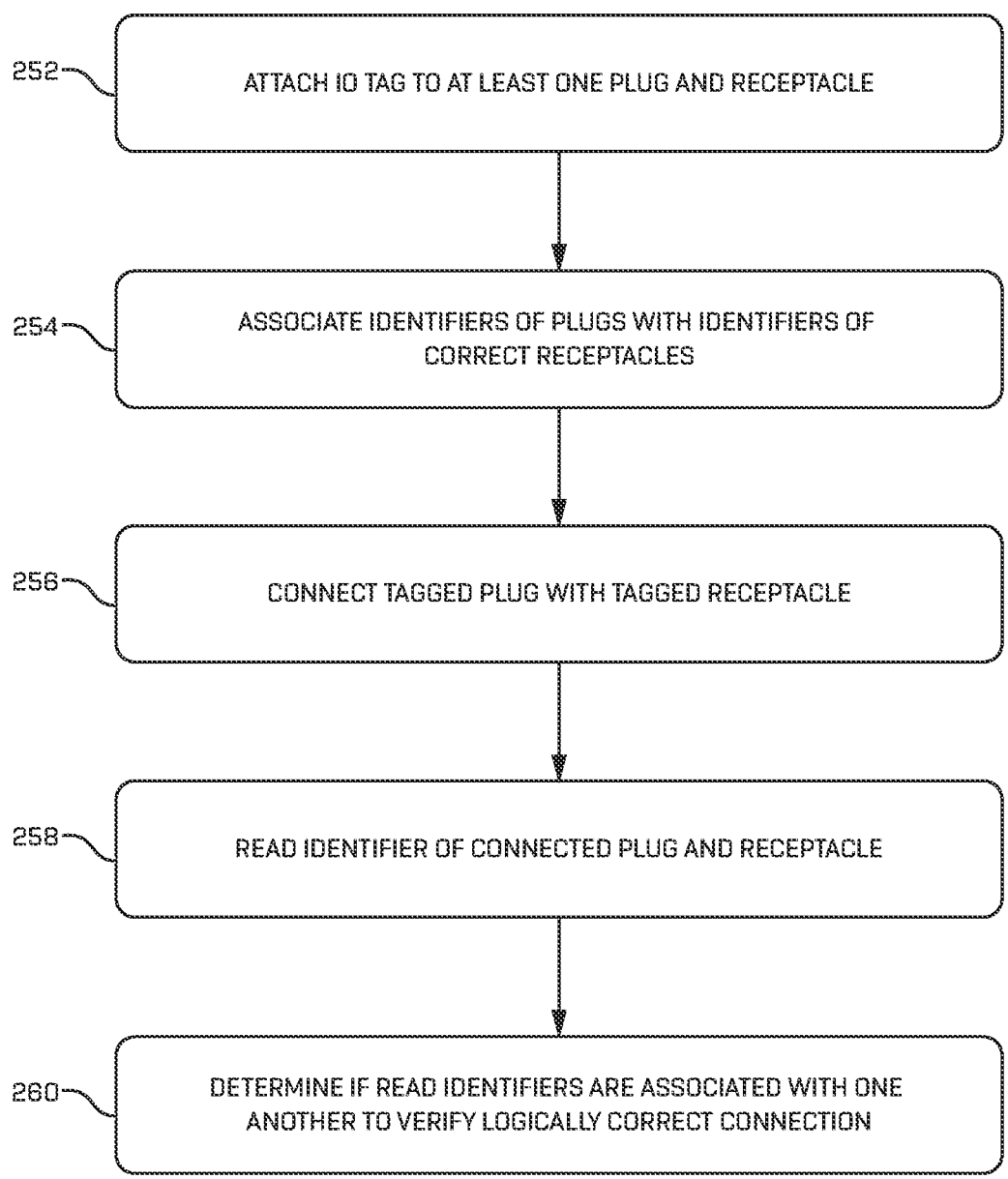
FIG. 2 illustrates an example of a flow diagram for a method of verifying correct connections of associated connector assemblies, according to one or more examples.

FIG. 2 illustrates an example of a flow diagram 250 for a method of verifying correct connections of associated connector assemblies, according to one or more examples. At 252 an identification tag is attached to at least one plug and at least one receptacle of an electrical system of a vehicle. In the examples shown in FIG. 1, identification tags 156, 158, 180 and 182 are attached to plugs 146, 148, 168 and 174, respectively; and identification tags 160, 162, 184, 186, 194 and 196 are attached to receptacles 150, 152, 170, 176, 190 and 192, respectively. At 254, the identifiers of the plugs may be associated with the identifiers of the correct receptacles with which the plugs are to be connected in the electrical system. In the examples shown in FIG. 1, the identifiers of identification tags 156, 158, 180 and 182 may be associated with the identifiers of identification tags 160, 162, 184 and 186, respectively. The associated identifiers may be stored in database 210 in memory 208.

At step 256, one of the tagged plugs is connected with one of the tagged receptacles. In the examples shown in FIG. 1, plug 146 is connected to receptacle 150. At step 258, the identifier of the connected plug and receptacle may be read. In the examples show in FIG. 1, the identifier of identification tag 156 that is attached to plug 146, and the identifier of identification tag 160 of receptacle 150 are read, such as by using tag reader 200. At 260, a determination is made as to whether the identifiers that were read are associated with one another to verify that the connected plug and receptacle are correct. In the examples shown in FIG. 1, the verification system 100 may access the database 210 to see if the identifiers are associated with one another. In the example shown in FIG. 1, since the identifier of the identification tag 160 and the identifier of the identification tag 156 are associated with one another, then the connected plug and receptacle are correct, and the connection is verified. If on the other hand, plug 146 were physically connected to receptacle 176 and the verification system 100 checked to determine if there was an association of the identifier of identification tag 156 and the identifier of identification tag 186, then the connected plug 146 and receptacle 176 would not be correct and the connection would not be verified. Since, in the example shown in FIG. 1, the plugs 146, 148, 168 and 174 are common connectors with one another, and the receptacles 150, 152, 170, 176, 190 and 192 are common receptacles with one another, then it is physically possible to connect any one of the plugs with any one of the receptacles even though each plug has only one correct electrical connection with one receptacle.

In some examples, each time a plug and receptacle are connected the identification tags may be read and verified. In some examples, when the identification tags are read, the identifiers are checked against identifiers that are expected. In some examples, when the connectors are connected and the identification tags are read, other identification tags for connectors that are already verified may also be read. In this situation, the system may ignore the verified connections and may only show the identifiers for the newly connected connectors. Thus, during manufacturing or debugging, the disclosed techniques may be used with a corresponding database that may include a list of corresponding connectors that may be read in a time ordered manner to validate correct connections.

Figure 3:
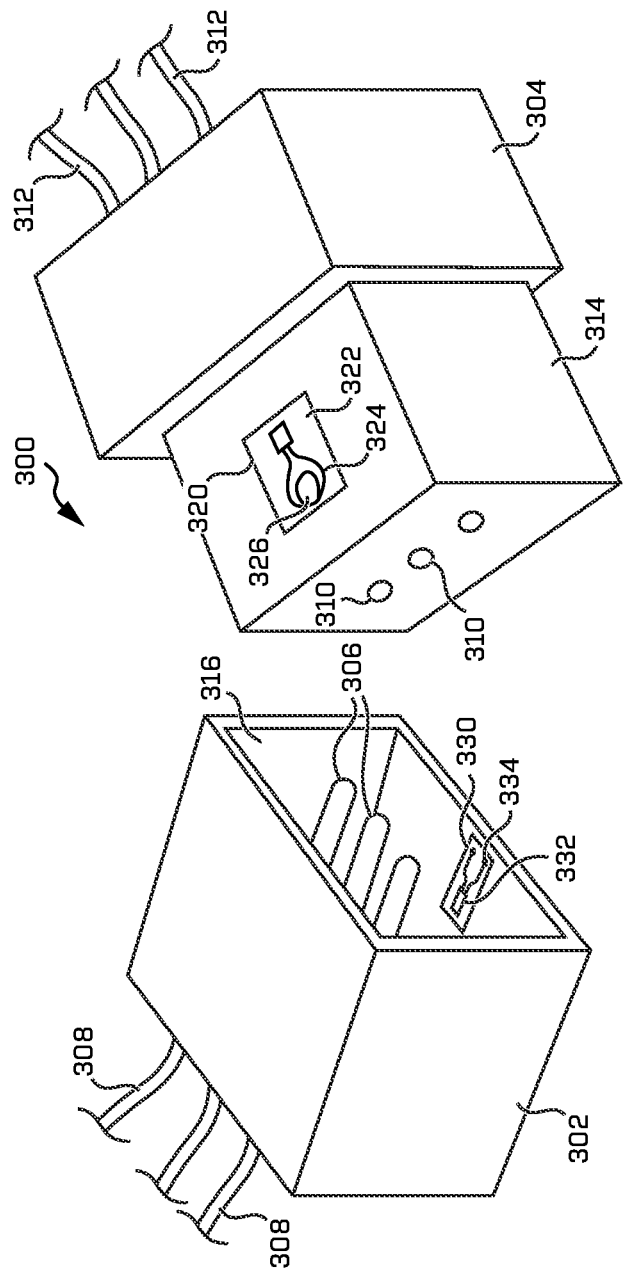
FIG. 3 is a diagrammatic view of an electrical connector assembly which may be used in the verification system shown in FIG. 1, according to one or more examples.

FIG. 3 shows a diagrammatic view of an electrical connector assembly 300 having a receptacle connector 302 and a plug connector 304 that are physically and electrically connectable to one another. Receptacle connector 302 includes three electrically conductive pins 306 which are electrically connected to three electrical conductors 308. Plug connector 304 includes three electrically conductive sleeves 310 that are electrically connected to three conductors 312. When connector 302 and connector 304 are physically connected an extended portion 314 of plug connector 304 is inserted in a recessed portion 316 of receptacle connector 304 and the conductors 308 are electrically connected to the conductors 312.

In the example shown in FIG. 3, the connector 304 includes an RF identification tag 320 which includes a chip 322, an antenna 324, and a pressure switch 326. When the connector 302 and connector 304 are physically connected the pressure switch 326 may be compressed between the recessed portion 316 of connector 302 and the extended portion 314 of connector 304. Compressing the pressure switch 326 may close an electrical circuit in the identification tag 320 which may enable the tag to operate. In some examples, compressing the pressure switch 326 completes an electrical circuit in the antenna 324 which allows the identification tag 320 to receive power from the tag reader. In some examples, the completed electrical circuit may be in another part of the RFID tag 320 and may be associated with operation of the chip 322.

In the example shown in FIG. 3, the connector 302 includes an RFID tag 330 which includes a chip 332 and an antenna portion 324. In this example, another portion of the RFID tag antenna may be connected to the extended portion 314 of the plug connector 302 such that, when the connector 302 and connector 304 are physically connected, the antenna is electrically connected and operable so that the RFID tag 330 is enabled. In the example shown, the other portion of the antenna would be positioned on an opposite side of the extended portion 314 from the RFID tag 320. In this example, the identification tag may be considered to be on the connector 302. Each of the chips 322 and/or 332 may be a programmable chip in which an identifier may be programmed, or the chip may not be programmable and may have a set identifier.

In some examples, a vehicle component and a vehicle wiring harness may each include one or more receptacle and/or plug and each receptacle and plug may have an attached RFID tag. In some examples, one or more of the component plugs may by physically connectable to more than one harness receptacles and/or one or more of the component receptacles may be physically connectable to more than one harness plug. In some examples, the RFID tags may be configured such that when a plug is inserted into a first receptacle a first signal is emitted, and when the plug is inserted into a second receptacle a second, different signal is emitted. In some examples, the first and second emitted signals may be indicative of whether a plug is connected to the correct receptacle.

In some examples, the tag reader may use one frequency of electromagnetic radiation to energize an RFID tag attached to the plug and may use a different frequency of electromagnetic radiation to energize an RFID tag attached to a corresponding receptacle. In some examples, the verification system may include reading one RFID tag identifier attached to a connector and then reading another RFID tag identifier attached to a corresponding connector.

In some examples, the identification tag, such as the RFID tag, may emit a first signal when a plug connector is connected to the correct receptacle connector, and may emit a second, different signal when the plug connector is connected to a wrong receptacle connector. In some examples, the signal that is emitted may include an identifier that may be related to a resistor-capacitor (RC) time constant. In some examples, the connection of the connectors may activate the identification tag and may electrically connect the resistor and capacitor. In some examples, the resistor may have a resistance value that, when combined with the capacitor, produce an emitted frequency that is indicative of whether a plug is connected to a correct receptacle. In some examples, the capacitor may have a capacitance value that, when combined with the resistor, produce an emitted frequency that is indicative of whether a plug is connected to a correct receptacle.

In some examples, the connectors may each have an identification tag attached that includes one or more coil having an inductance. In some examples, an inductance may be used in generating a signal with an identifier that is indicative of whether a plug is connected to a correct receptacle. In some examples, a coil may be positioned on one of the plug and receptacle and a magnetic core may be position on the other of the plug and receptacle, and the coil and core may be aligned when the plug and receptacle are connected and may be used in generating a signal with an identifier that is indicative of whether a plug is connected to a correct receptacle. In some examples, that signal may be a frequency. In some examples, the coil and core may be positioned on their respective connector such that they align when the correct plug and receptacle are connected. In some examples, the identification tags may include one or more coils that only resonate at an assigned frequency when the correct connectors are in proximity or are physically joined with one another. In some examples, an identification tag may be attached to each of the plug and receptacle and each of the identification tags may be individually activated when read by the tag reader. In some examples, each of the identification tags may have a corresponding frequency that may be used to indicate whether the plug is connected to the correct receptacle. In some examples, an identification frequency may be read each time a plug is connected to a receptacle. In some examples the frequency may be or may include a frequency pattern that may be used for identification of the connection.

In some examples, an identification tag attached to one of the plug and receptacle may include a component for producing an identifier based at least in part on another component attached to the other of the plug and receptacle. In some examples, an identification tag attached to one of the plug and receptacle may include an analog-to-digital (A/D) converter, and the component attached to the other of the plug and receptacle may be a resistor. In this example, physically connecting the plug and receptacle may electrically connect the resistor to the A/D converter which may produce a digital value based on a resistance of the resistor. In some examples, the digital value may be emitted with a signal and may be indicative of whether the plug is connected to the correct receptacle. In some examples, the electrical connection may be using electrical connection pads as discussed below. In some examples, a digital signal may pass through a corresponding bit shifter or similar component which may output a unique digital signal for a connector pair from among the available connections. This modification may be selectable such that a common component may be configured to modify digital signals in different ways.

In some examples, a delay or repetition frequency may be implemented with a digital or analog signal emitted from an RFID tag wherein each pair may have a different delay (e.g., from when a corresponding activation signal is received from a passive RFID tag reader) or repetition frequency. In some examples two RFID tags may be used that each emit a different signal when two connectors are physically coupled together. In some examples, these two signals may operate on a similar or same frequency but different periodicities such that, together, they appear to be a single unique signal with unique time components.

In some examples, an antenna or coil may be formed from the physical arrangement of a coupling of two connectors and their respective tag placements to modify a change, frequency, etc. of an RFID tag. In some examples, the disclosed techniques can be used to modify an RFID tag's ability to receive a signal from an RFID reader (e.g., the reader may cycle through different frequencies wherein an RFID tag may respond to a corresponding frequency.

In some examples, a correct connection of a plug and a receptacle may produce a unique identifier, while an incorrection connection of one of the plug or receptacle may produce no identifier or a different identifier. In some examples, this may be accomplished using one or more coil, resistor, capacitor.

Figure 4:
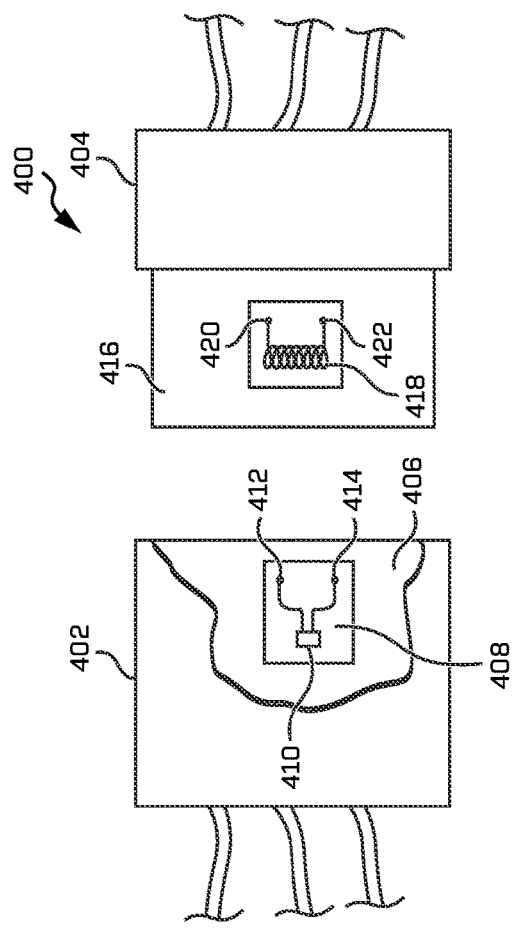
FIG. 4 is a diagrammatic view of another electrical connector assembly which may be used in the verification system shown in FIG. 1, according to one or more examples.

FIG. 4 shows a diagrammatic view of a connector assembly 400 and an RFID tag that may be enabled by connection of a receptacle connector 402 and a plug connector 404, as part of a verification system. The receptacle connector 402 is show partially cut away to show a part of a recessed portion of the connector with an inner surface 406. An RFID tag 408 is attached to the inner surface 406 of the receptacle connector portion 402. The RFID tag 408 includes a chip 410, which has an identifier, and electrical connection pads 412 and 414. The plug connector 404 shows an outer surface 416 of an extended portion of the plug connector. When the receptacle connector and plug connector are physically connected the extended portion is positioned in the recessed portion of the receptacle connector and the outer surface 416 faces the inner surface 406. An antenna 418 is attached to the plug connector 404 and the antenna includes electrical connection pads 420 and 422. When the receptacle connector and plug connector are physically connected, the electrical connection pads 412 and 422 contact one another and electrical connection pads 414 and 420 contact one another and the antenna 418 is electrically connected to the chip 410 to enable the RFID tag 408.

In some examples, the plug and/or receptacle may include an RFID tag that is enabled only when the correct plug and receptacle are physically connected. In some examples, the connection pads could be positioned such that the antenna connection pads only align with the chip connection pads for connectors that are correctly connected. In some examples, the connection pads of the chip and antenna may have a spacing that only connect for a corresponding plug and receptacle. In some examples, the connection pads of the chip and antenna may be shifted toward one side or the other, and/or the front or back of the connector to which they are attached so that they only connect for a corresponding plug and receptacle. In some examples, the connection pads may be arranged such that one pad is closer to the front or back of the connector than the other. The back of the connector may refer to a side of the connector that is closer to the wires that enter the connector, and the front of the connector may refer to a side of the connector that is opposite of the back of the connector. In some examples, the connection pads of the chip and antenna may be on different sides of the connector, which may be on opposite sides or adjacent sides.

In some examples, the chip may be connected to a coil on one of the plug and receptacle and the antenna may be connected to another coil on the other of the plug and receptacle, and the coils may be inductively coupled when the plug and receptacle are connected to one another. In some examples, the coils may be selected so that the identification tag emits an identifier that is indicative of whether the plug is connected to the correct receptacle.

Figure 5:
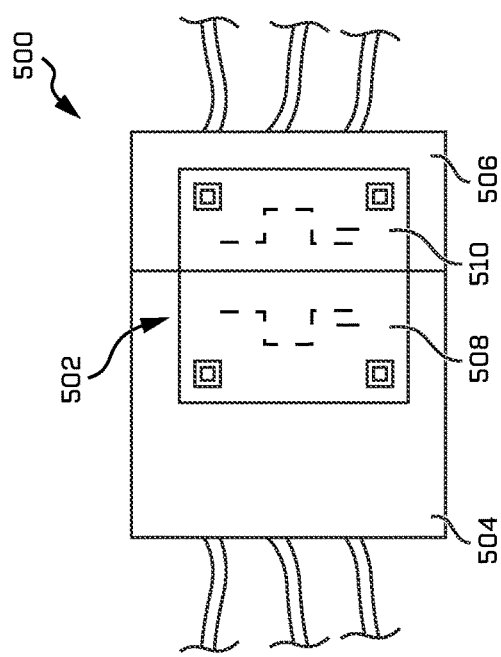
FIG. 5 is a diagrammatic view of another electrical connector assembly which may be used in the verification system shown in FIG. 1, according to one or more examples.

FIG. 5 shows a diagrammatic view of a connector assembly 500 and an identification tag 502 that may be used as part of a verification system. The connector assembly 500 includes a receptacle connector 504 and a plug connector 506 that are physically and electrically connected to one another. In the example shown in FIG. 5, the identification tag 502 is a QR code tag. A first portion 508 of the identification tag 502 may be attached to the receptacle connector 504, and a second portion 510 of the identification tag 502 may be attached to the plug connector 504. When the receptacle connector 504 and a plug connector 506 are connected to one another the identification tag 502 may be completed and may be read by an identification tag reader. Although shown as a QR code, the identification tag may be another form of bar code and the identification tag reader may include a laser for scanning the bar code. In some examples, each of the receptacle connector 504 and a plug connector 506 may have a separate bar code that may be read separately from one another.

Figure 6:
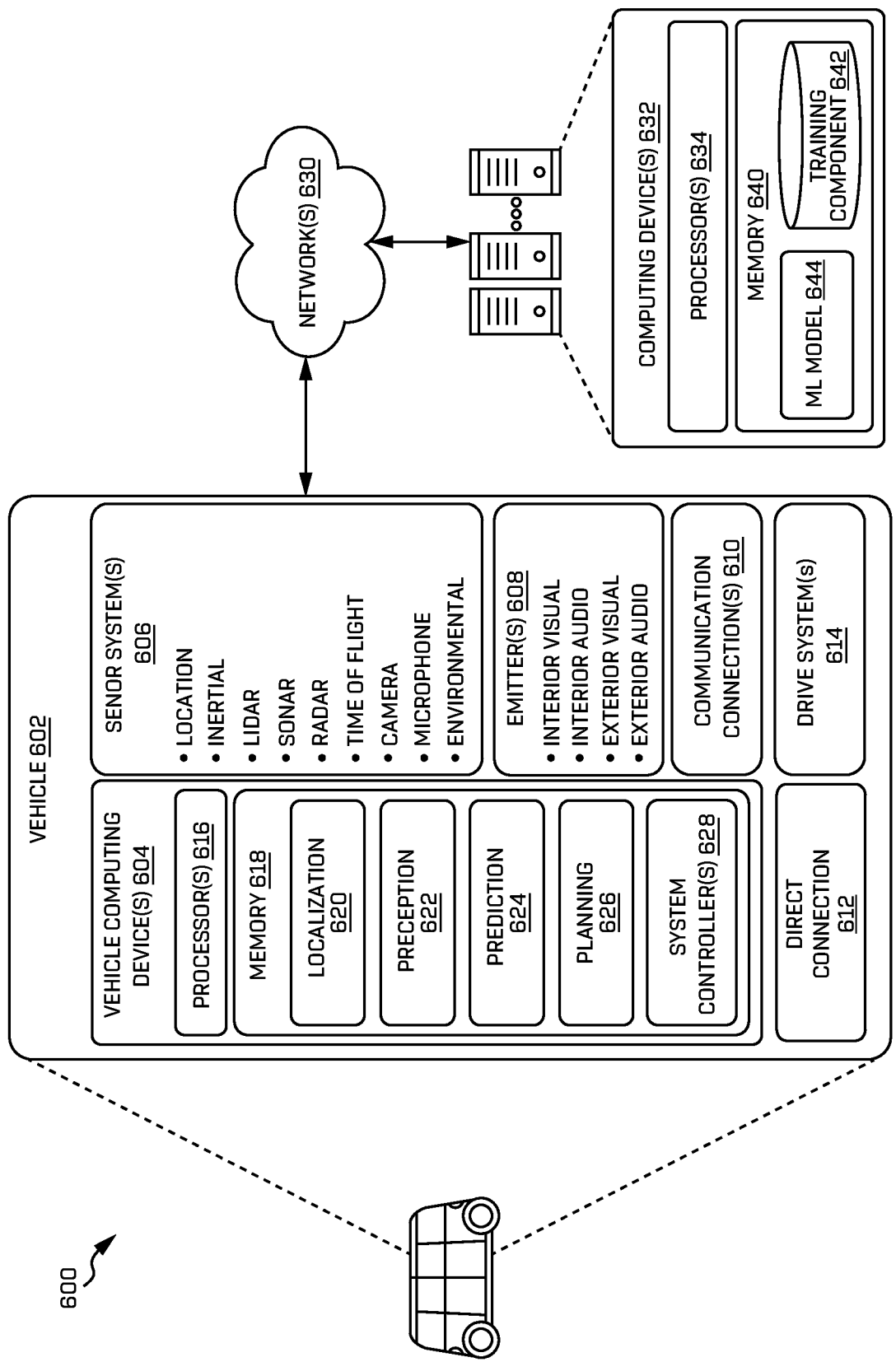
FIG. 6 depicts a block diagram of an example vehicle system on which the verification system shown in FIG. 1 may be used to verify that electrical connectors are correctly connected in a vehicle, according to one or more examples.

FIG. 6 depicts a block diagram of an example vehicle system 600 on which the verification system 100 (FIG. 1) may be used to verify that electrical connectors are correctly connected in a vehicle 602. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification. Moreover, in some instances, the techniques described herein may be usable by non-autonomous vehicles as well.

The vehicle 602 may include computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle 602 to exchange data and/or to provide power), and one or more drive system(s) 614. The drive system(s) 614 also include communication connection(s) that enable communication by the respective drive module with other local or remote computing device(s).

In at least some examples, the sensor system(s) 606 may include thermal sensors (e.g., LWIR sensors), time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., visible, RGB, IR, intensity, depth, etc.), microphone sensors, environmental sensors, (e.g., temperature sensors, humidity sensors, light sensors, pressure sensors, etc.), ultrasonic transducers, wheel encoders, etc. In some examples, the sensor system(s) 606 may include multiple instances of each type of sensors. For instance, time-of-flight sensors may include individual time-of-flight sensors located at the corners, front, back, sides, and/or top of the vehicle 602. As another example, camera sensors may include multiple cameras disposed at various locations about the exterior and/or interior of the vehicle 602. In some cases, the sensor system(s) 606 may provide input to the computing device(s) 604. In some examples the sensor systems 606 may include common connectors that have the same configuration as one another.

The vehicle 602 may also include one or more emitter(s) 608 for emitting light and/or sound. The one or more emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology. In some examples the emitter(s) 608 may include common connectors that have the same configuration as one another.

The vehicle 602 can also include one or more communication connection(s) 610 that enable communication between the vehicle 602 and one or more other local or remote computing device(s) (e.g., a remote teleoperations computing device) or remote services. For instance, the communication connection(s) 610 can facilitate communication with other local computing device(s) on the vehicle 602 and/or the drive system(s) 614. Also, the communication connection(s) 510 may allow the vehicle 602 to communicate with other nearby computing device(s) (e.g., other nearby vehicles, traffic signals, etc.). In some examples the communication connection(s) 610 may include common connectors that have the same configuration as one another.

The communications connection(s) 610 may include physical and/or logical interfaces for connecting the computing device(s) 604 to another computing device or one or more external network(s) 630 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 610 may comprise the one or more modems as described in detail above.

In at least one example, the vehicle 602 may include one or more drive system(s) 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 can include one or more sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which may receive and preprocess data from the sensor system(s) 606 and to control operation of the various vehicle systems. In some examples, the drive system controller can include one or more processor(s) and memory communicatively coupled with the one or more processor(s). The memory can store one or more modules to perform various functionalities of the drive system(s) 614. Furthermore, the drive system(s) 614 also include one or more communication connection(s) that enable communication by the respective drive system with one or more other local or remote computing device(s). In at least some examples, the drive system(s) 614 may common connectors that have the same configuration as one another.

The computing device(s) 604, such as computing device 202, may include one or more processors 616, such as one or more processors 206, and one or more memories 618, such as memory(s) 208, communicatively coupled with the processor(s) 616. In the illustrated example, the memory 618 of the computing device(s) 604 may include localization system(s) 620, perception systems(s) 622, prediction systems(s) 624, planning system 626 as well as one or more system controller(s) 628. The memory 620 may also store data captured or collected by the one or more sensors systems 606, map data and environment data.

In at least one example, the computing device(s) 604 may store one or more and/or system controllers 628, which may be configured to control steering, propulsion, braking, safety, emitters, communication, and other systems of the vehicle 602. The system controllers 628 may communicate with and/or control corresponding systems of the drive system(s) 614 and/or other components of the vehicle 602, which may be configured to operate in accordance with a route provided from a planning system. In some examples the system controllers 628 may include common connectors that have the same configuration as one another.

In some implementations, the vehicle 602 may connect to computing device(s) 632 via the network(s) 630. For example, the computing device(s) 632 may generate and provide map data and/or environment data to the vehicle 602. The computing device 632 may include one or more processor(s) 634 and memory 640 communicatively coupled with the one or more processor(s) 634. In at least one instance, the processor(s) 634 may be similar to the processor(s) 616 and the memory 640 may be similar to the memory 618.

The processor(s) 616 of the computing device(s) 604 and the processor(s) 634 of the computing device(s) 632 may be any suitable processor capable of executing instructions to process data and perform operations as described herein. By way of example and not limitation, the processor(s) 616 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 of the computing device(s) 604 and the memory 640 of the computing device(s) 632 are examples of non-transitory computer-readable media. The memory 618 and 640 can store an operating system and one or more software applications, instructions, programs, and/or data to implement the methods described herein and the functions attributed to the various systems. In various implementations, the memory 618 and 640 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some instances, aspects of some or all of the components discussed herein can include any models, algorithms, and/or machine learning algorithms. For example, in some instances, the components in the memory 618 and 640 can be implemented as a neural network which may include a machine learning model 644 and a training component 642.

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A system comprising:
a vehicle component having a first and second receptacle, wherein:
   the first receptacle is mechanically coupled to a first radio-frequency identification (RFID) tag component; and
   the second receptacle is mechanically coupled to a second RFID tag component;
a vehicle harness having a plug mechanically coupled to a third RFID tag component, wherein the plug is physically connectable to either the first or second receptacle; and
wherein the first, second, and third RFID tag components are configured such that:
   when the plug is inserted into the first receptacle, the first and third RFID tag components are coupled and emit a first signal; and
   when the plug is inserted into the second receptacle, the second and third RFID tag components are coupled and emit a second signal, different from the first signal and wherein the first and second emitted signals are indicative of whether the plug is connected to first or second receptacle.

B. The system of clause A, wherein the third RFID tag component is configured differently when coupled to the first or the second RFID tag component by modifying a resistance-capacitance (RC) value of the third RFID component.

C. The system of clause A, wherein the first RFID tag component and the second RFID tag component differently modify an antenna portion of the third RFID tag component.

D. The system of any of clauses A-C, wherein first, second, and third RFID tag components are removable coupled to the first receptacle, second receptacle, or the plug.

E. The system of any of clauses A-D, wherein the first emitted signal is generated using a first combination of inductances, and the second emitted signal is generated using a second combination of inductances.

F. The system of clause A, wherein the third RFID tag component is configured to emit the first signal in response to a mechanical, pressure-sensitive coupling to the first RFID tag component and to emit the second signal in response to a different mechanical, pressure-sensitive coupling to the second RFID tag component.

G. A method for verifying connections of associated connector assemblies in an electrical system, the method comprising:
   connecting an electrical plug to corresponding first electrical receptacle, wherein the electrical plug is coupled to a first tag component and the electrical receptacle is coupled to a second tag component and wherein the electrical system includes at least one other second electrical receptacle with a third tag component that the electrical plug is mechanically compatible with;
   reading a first identifier when the electrical plug is connected with the first electrical receptacle and a different second identifier is available when the electrical plug is connected to the second electrical receptacle; and
   determining, based on the first identifier, that the plug is inserted into the first electrical receptacle.

H. The method as defined in clause G, wherein the first, second, and third tag components form radio-frequency identification (RFID) tags and the reading the first identifier includes receiving a signal at a distance from the RFID tags using electromagnetic waves.

I. The method as defined in clause H, further comprising enabling the operation of the RFID tags to emit a corresponding signal by connecting the electrical plug to a corresponding receptacle.

J. The method as defined in any of clauses G-I, wherein the RFID tags are enabled to transmit or received a signal by completing a circuit of the corresponding one of the RFID tags when the plug is connected to a corresponding tagged receptacle.

K. The method as defined in any of clauses G-J, wherein the completing the circuit includes completing an antenna configured to receive or transmit radio-frequency signals.

L. The method as defined in any of clauses G-I, wherein the RFID tags are enabled using a pressure switch when the plug is connected to a corresponding tagged receptacle.

M. The method as defined in any of clauses G, wherein the first, second, and third tag components each includes at least part of a visually identifiable bar code and the reading the first identifier includes scanning a bar code.

N. The method as defined in clause M, wherein the first tag component and the third tag component together form a unique visually identifiable bar code when the electrical plug is inserted into the first electrical receptacle.

O. The method as defined in any of clauses M-N, wherein the second electrical receptacle and the third electrical receptacle are keyed differently such that the bar code of the plug aligns differently with a bar code of the first electrical receptacle and a bar code of the second electrical receptacle.

P. The method as defined in any of clauses G-O, wherein the first tag component or the third tag component is removably coupled to the first electrical receptacle or the electrical plug.

Q. A system for verifying correct electrical connections of associated connector assemblies in an electrical system having multiple connector assemblies that each include a plug and a receptacle, the system comprising:
   a first identification tag attached to an electrical plug;
   a second identification tag attached to a first electrical receptacle;
   a third identification tag attached to a second electrical receptacle, the third identification tag different from the third identification tag;

non-volatile computer readable medium storing instruction which when executed by one or more processor cause the system to perform the acts comprising:
receiving a first identifier associated with the electrical plug being coupled the first electrical receptacle, the first identifier associated with the first and second identification tags, wherein the first identifier is different from a second identifier associated with the second and third identification tags; and
determining that the electrical plug is coupled to the first electrical receptacle based at least in part on receiving the first identifier.

R. The system of clause Q, wherein the first, second, and third identification tags are RFID tag components.

S. The system of clause R, wherein the combination of the first identification tag and the second identification tag is enabled as an RFID tag when the electrical plug is physically connected to the first electrical receptacle.

T. The system of any of clauses R-S, wherein the RFID tag is a passive RFID tag.

What is claimed is:

1. A system comprising:
a vehicle component having a first and second receptacle, wherein:
the first receptacle is mechanically coupled to a first radio-frequency identification (RFID) tag component; and
the second receptacle is mechanically coupled to a second RFID tag component;
a vehicle harness having a plug mechanically coupled to a third RFID tag component, wherein the plug is physically connectable to either the first or second receptacle; and
wherein the first, second, and third RFID tag components are configured such that:
when the plug is inserted into the first receptacle, the first and third RFID tag components are coupled and emit a first signal; and
when the plug is inserted into the second receptacle, the second and third RFID tag components are coupled and emit a second signal, different from the first signal and wherein the first and second emitted signals are indicative of whether the plug is connected to first or second receptacle.

2. The system of claim 1, wherein the third RFID tag component is configured differently when coupled to the first or the second RFID tag component by modifying a resistance-capacitance (RC) value of the third RFID component.

3. The system of claim 1, wherein the first RFID tag component and the second RFID tag component differently modify an antenna portion of the third RFID tag component.

4. The system of claim 1, wherein first, second, and third RFID tag components are removable coupled to the first receptacle, second receptacle, or the plug.

5. The system of claim 1, wherein the first emitted signal is generated using a first combination of inductances, and the second emitted signal is generated using a second combination of inductances.

6. The system of claim 1, wherein the third RFID tag component is configured to emit the first signal in response to a mechanical, pressure-sensitive coupling to the first RFID tag component and to emit the second signal in response to a different mechanical, pressure-sensitive coupling to the second RFID tag component.

7. A method for verifying connections of associated connector assemblies in an electrical system, the method comprising:
connecting an electrical plug to a corresponding first electrical receptacle, wherein the electrical plug is coupled to a first tag component and the first electrical receptacle is coupled to a second tag component and wherein the electrical system includes at least one other second electrical receptacle with a third tag component that the electrical plug is mechanically compatible with;
reading a first identifier when the electrical plug is connected with the first electrical receptacle and a different second identifier is available when the electrical plug is connected to the second electrical receptacle; and
determining, based on the first identifier, that the plug is inserted into the first electrical receptacle.

8. The method as defined in claim 7, wherein the first, second, and third tag components form radio-frequency identification (RFID) tags and the reading the first identifier includes receiving a signal at a distance from the RFID tags using electromagnetic waves.

9. The method as defined in claim 8, further comprising enabling the operation of the RFID tags to emit a corresponding signal by connecting the electrical plug to a corresponding receptacle.

10. The method as defined in claim 9, wherein the RFID tags are enabled to transmit or received a signal by completing a circuit of the corresponding one of the RFID tags when the plug is connected to a corresponding tagged receptacle.

11. The method as defined in claim 10, wherein the completing the circuit includes completing an antenna configured to receive or transmit radio-frequency signals.

12. The method as defined in claim 9, wherein the RFID tags are enabled using a pressure switch when the plug is connected to a corresponding tagged receptacle.

13. The method as defined in claim 7, wherein the first, second, and third tag components each includes at least part of a visually identifiable bar code and the reading the first identifier includes scanning a bar code.

14. The method as defined in claim 13, wherein the first tag component and the third tag component together form a unique visually identifiable bar code when the electrical plug is inserted into the first electrical receptacle.

15. The method as defined in claim 13, wherein the second electrical receptacle and the third electrical receptacle are keyed differently such that the bar code of the plug aligns differently with a bar code of the first electrical receptacle and a bar code of the second electrical receptacle.

16. The method as defined in claim 7, wherein the first tag component or the third tag component is removably coupled to the first electrical receptacle or the electrical plug.

17. A system for verifying correct electrical connections of associated connector assemblies in an electrical system having multiple connector assemblies that each include a plug and a receptacle, the system comprising:
a first identification tag attached to an electrical plug;
a second identification tag attached to a first electrical receptacle;
a third identification tag attached to a second electrical receptacle, the third identification tag different from the third identification tag;
non-volatile computer readable medium storing instruction which when executed by one or more processor cause the system to perform the acts comprising:

receiving a first identifier associated with the electrical plug being coupled to the first electrical receptacle, the first identifier associated with the first and second identification tags, wherein the first identifier is different from a second identifier associated with the second and third identification tags; and determining that the electrical plug is coupled to the first electrical receptacle based at least in part on receiving the first identifier.

18. The system of claim 17, wherein the first, second, and third identification tags are RFID tag components.

19. The system of claim 18, wherein the combination of the first identification tag and the second identification tag is enabled as an RFID tag when the electrical plug is physically connected to the first electrical receptacle.

20. The system of claim 19, wherein the RFID tag is a passive RFID tag.

* * * * *